US008560410B2

(12) United States Patent
Narkar

(10) Patent No.: US 8,560,410 B2
(45) Date of Patent: Oct. 15, 2013

(54) MAPPING A MOBILE DEVICE LOCATION TO BILLING REGIONS IN INTERNET PROTOCOL MULTIMEDIA SUBSYSTEMS

(75) Inventor: Vishal Narkar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 342 days.

(21) Appl. No.: 12/856,515

(22) Filed: Aug. 13, 2010

(65) Prior Publication Data

US 2012/0041856 A1 Feb. 16, 2012

(51) Int. Cl.
| | |
|---|---|
| *G07B 17/00* | (2006.01) |
| *G07F 19/00* | (2006.01) |
| *H04M 11/00* | (2006.01) |
| *H04W 4/24* | (2009.01) |
| *H04W 4/12* | (2009.01) |

(52) U.S. Cl.
CPC *H04W 4/24* (2013.01); *H04W 4/12* (2013.01); *H04M 11/00* (2013.01)
USPC ............ 705/34; 455/405; 455/406; 455/407; 455/408; 370/328; 370/338; 705/20; 705/30

(58) Field of Classification Search
CPC .......... H04W 4/24; H04W 4/12; H04W 24/00
USPC ........... 455/405–408, 445, 455, 456.2, 435.1, 455/456.1; 370/338, 352, 328, 401; 705/20, 705/34
See application file for complete search history.

(56) References Cited

U.S. PATENT DOCUMENTS

| | | | | | |
|---|---|---|---|---|---|
| 5,295,180 | A | * | 3/1994 | Vendetti et al. | 455/456.2 |
| 5,546,445 | A | * | 8/1996 | Dennison et al. | 455/408 |
| 5,774,802 | A | * | 6/1998 | Tell et al. | 455/408 |
| 6,044,261 | A | * | 3/2000 | Kazmi | 455/408 |
| 6,516,190 | B1 | * | 2/2003 | Linkola | 455/408 |
| 7,054,642 | B1 | * | 5/2006 | Matz et al. | 455/453 |
| 7,256,732 | B2 | * | 8/2007 | De Salas et al. | 342/357.29 |
| 7,512,234 | B2 | * | 3/2009 | McDonnell et al. | 380/247 |
| 7,668,765 | B2 | * | 2/2010 | Tanaka et al. | 705/34 |
| 8,019,841 | B2 | * | 9/2011 | Ellis et al. | 709/223 |

(Continued)

FOREIGN PATENT DOCUMENTS

WO WO-2012021842 A2 2/2012

OTHER PUBLICATIONS

Meneses, F., & Moreira, A. (2006). Using GSM CellID Positioning for plce discovering. Proceeding of IEEE, 2006, 1-8. doi:10.1109/PCTHEALTH.2006.361692.*

(Continued)

*Primary Examiner* — Matthew Gart
*Assistant Examiner* — Olusegun Goyea
(74) *Attorney, Agent, or Firm* — Perkins Coie LLP

(57) ABSTRACT

A location mapping service ("LMS") that allows the integrations of an IMS core with the location-based billing methods of a legacy core network. The LMS uses the estimated location of a mobile device during an IMS session in order to determine a Cell Global Identification ("CGI") to associate with the session. The LMS then provides the determined CGI to the legacy core network, so that a billing gateway may determine the billing region to associate with the IMS session. The LMS thereby facilitates location-based billing for IMS sessions in the absence of actual CGI information.

31 Claims, 4 Drawing Sheets

(56) References Cited

U.S. PATENT DOCUMENTS

| | | | |
|---|---|---|---|
| 8,060,109 B2* | 11/2011 | Fomukong et al. | 455/456.1 |
| 8,090,343 B2* | 1/2012 | Kazmi | 455/405 |
| 8,090,344 B2* | 1/2012 | Hamadi et al. | 455/405 |
| 8,238,874 B2* | 8/2012 | Aebi | 455/406 |
| 2001/0041554 A1* | 11/2001 | Rowell | 455/406 |
| 2002/0123934 A1* | 9/2002 | Tanaka et al. | 705/20 |
| 2006/0001570 A1* | 1/2006 | Salas et al. | 342/357.17 |
| 2006/0014531 A1* | 1/2006 | Nam et al. | 455/418 |
| 2006/0117020 A1* | 6/2006 | Toebes et al. | 707/10 |
| 2006/0268902 A1* | 11/2006 | Bonner | 370/401 |
| 2007/0030973 A1* | 2/2007 | Mikan | 380/270 |
| 2008/0108373 A1* | 5/2008 | Agarwal et al. | 455/456.6 |
| 2008/0171531 A1* | 7/2008 | Vohringer et al. | 455/406 |
| 2009/0016274 A1* | 1/2009 | Nylander et al. | 370/328 |
| 2009/0061857 A1* | 3/2009 | Kazmi | 455/433 |
| 2009/0061868 A1* | 3/2009 | Kazmi | 455/435.1 |
| 2010/0014507 A1* | 1/2010 | Linkola et al. | 370/352 |
| 2010/0046406 A1* | 2/2010 | Annamalai et al. | 370/310 |
| 2010/0048165 A1* | 2/2010 | Caldwell et al. | 455/406 |
| 2010/0130227 A1* | 5/2010 | Farthofer et al. | 455/456.1 |
| 2010/0202407 A1 | 8/2010 | Edge | |
| 2010/0208648 A1* | 8/2010 | Narkar et al. | 370/328 |
| 2010/0220700 A1* | 9/2010 | Hodroj et al. | 370/338 |
| 2011/0051658 A1* | 3/2011 | Jin et al. | 370/328 |
| 2011/0092205 A1* | 4/2011 | Masuda et al. | 455/435.1 |
| 2012/0002646 A1* | 1/2012 | Zabawskyj et al. | 370/338 |
| 2012/0069776 A1* | 3/2012 | Caldwell et al. | 370/271 |
| 2012/0140749 A1* | 6/2012 | Caldwell et al. | 370/338 |
| 2012/0164979 A1* | 6/2012 | Bachmann et al. | 455/411 |

OTHER PUBLICATIONS

International Searching Authority, International Search Report and Written Opinion, PCT Application PCT/US2011/047651, mailed Feb. 23, 2012, 8 pages.

* cited by examiner

| Session ID | Device ID | Device Location | Billing CGI | Session Characteristics | ... |
|---|---|---|---|---|---|
| 54321 | 1235ABC | Lat/Long = (36°32'15"', 115°0'0"') | 310.026.1F.B1.A2.0C.1A.C2.35.11 | Init_Time = 2010-10-30 T 10:45 UTC  Duration = 60 min  Data = 300MB | ... |
| 98765 | 5678DEF | ZIP = 98101 | 310.026.DA.21.C1.DD.52.78.9A.35 | Init_Time = 2010-10-30 T 10:46 UTC  Duration = 12 min  Data = 1000MB | ... |
| 87654 | 3210AAA | Street = 1234 A Street, Anywhere, CA 98000 | 310.026.5A.82.E1.97.57.A8.4B.16 | Init_Time = 2010-10-30 T 10:48 UTC  Duration = 5 min  Data = 600MB | ... |
| ... | ... | ... | ... | ... | ... |

| Billing CGI | Time Zone | Metro Code | ... |
|---|---|---|---|
| 310.026.1F.B1.A2.0C.1A.C2.35.11 | Pacific | LAX | ... |
| 310.026.DA.21.C1.DD.52.78.9A.35 | Mountain | DEN | ... |
| 310.026.5A.82.E1.97.57.A8.4B.16 | Eastern | BOS | ... |
| ... | ... | ... | ... |

FIG. 2C

| Billing CGI | Min ZIP | Max ZIP | Min Lat/Long | Max Lat/Long | ... |
|---|---|---|---|---|---|
| 310.026.1F.B1.A2.0C.1A.C2.35.11 | 90200 | 90220 | 36°;115° | 37°;116° | ... |
| 310.026.DA.21.C1.DD.52.78.9A.35 | 93560 | 93560 | 39°, 104° | 40°, 105° | ... |
| ... | ... | ... | ... | ... | ... |

MAPPING A MOBILE DEVICE LOCATION TO BILLING REGIONS IN INTERNET PROTOCOL MULTIMEDIA SUBSYSTEMS

BACKGROUND

Internet Protocol Multimedia Subsystems ("IMS") is an architecture framework for delivering Internet Protocol ("IP") multimedia to mobile users, such as users of mobile devices. An IMS core network ("IMS core") permits wireless or wireline mobile devices to access IP-based multimedia, messaging, and voice applications and services during an IMS session. For example, an IMS core may facilitate a session that is a voice call conducted via voice-over-IP ("VoIP"). A mobile service provider, such as a mobile communication and data service provider, may operate or utilize an IMS core in order to provision multimedia services to mobile subscribers across a geographic service region, such as an entire country. A mobile service provider may wish to bill or charge a subscriber for an IMS session using service rates that depend in part on the location of the subscriber during the session.

A mobile service provider may integrate an IMS core with an existing or "legacy" mobile communication infrastructure configured to deliver voice, messaging, and data services to mobile devices. As an example, a mobile service provider may integrate an IMS core with an existing Global System for Mobile Communications ("GSM")/General Packet Radio Service ("GPRS") core network that provides voice, messaging, and/or data services to mobile subscribers. The legacy communication infrastructure may implement pre-existing, location-based billing methods. The service provider may, for example, bill a subscriber for a voice call or data transfer switched over the legacy infrastructure using service rates that depend in part on the location of a mobile device. These pre-existing methods may determine the location of a mobile device by evaluating a Cell Global Identification ("CGI") assigned to a cell site within an existing radio network. Such methods of billing are inadequate for traffic over an integrated IMS core, however, because the legacy methods of location-based billing are not applicable to IP-based traffic.

BRIEF DESCRIPTION OF THE DRAWINGS

FIG. 2A depicts a table schema that conceptually illustrates how a location mapping service maps an IMS session to an estimated location of a mobile device and a billing Cell Global Identification.

FIG. 2B depicts a table schema that conceptually illustrates how a billing gateway maps a Cell Global Identification to one or more billing regions.

FIG. 2C depicts a table schema that conceptually illustrates how a location mapping service maps geographical locations to a billing Cell Global Identification.

DETAILED DESCRIPTION

In order to seamlessly integrate an IMS core with the location-based billing methods of a legacy core network, a location mapping service ("LMS") is described. The LMS uses the estimated location of a mobile device during an IMS session in order to determine a Cell Global Identification ("CGI") to associate with the session. The LMS then provides the determined CGI to the legacy core network, so that a billing gateway may determine the billing region to associate with the IMS session. The LMS thereby facilitates location-based billing for IMS sessions in the absence of actual CGI information.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

A. Representative Environment and Integrated Communication System

Figure 1A:
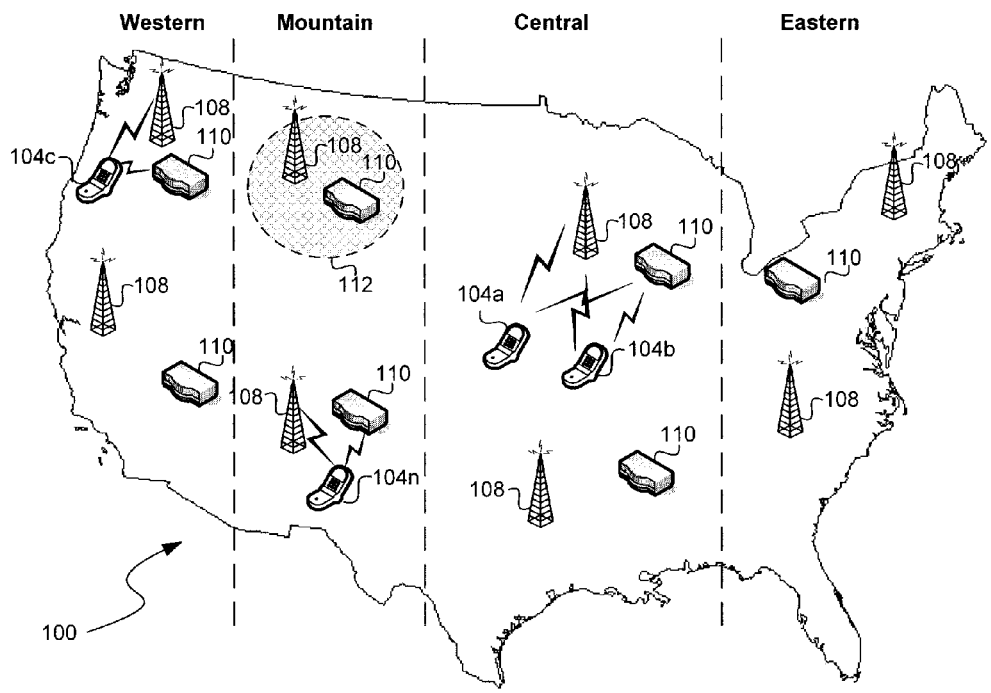
FIG. 1A illustrates a representative environment in which a location mapping service may facilitate billing a subscriber for IMS services using the location of the mobile device.
Figure 1B:
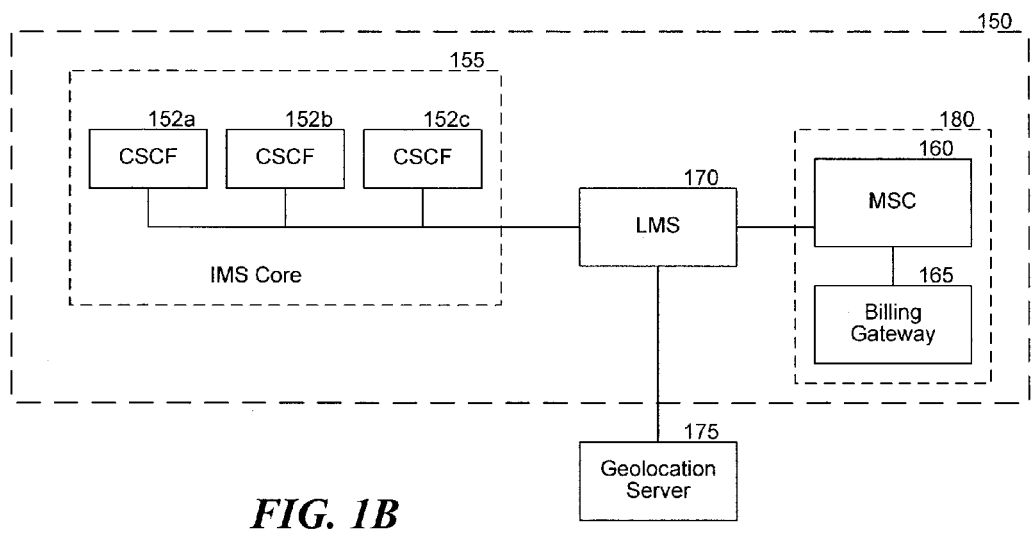
FIG. 1B is a block diagram of a portion of an integrated communication system for billing a subscriber for IMS services using the location of a mobile device.

FIG. 1A illustrates a representative environment 100 in which a location mapping service facilitates the billing of a subscriber for IMS services using the location of the subscriber's mobile device 104. FIG. 1B is a block diagram of a portion of an integrated communication system 150 for billing a subscriber for IMS services using the location of the subscriber's mobile device.

Multiple mobile devices 104a, 104b, . . . 104n may be distributed over a geographic service region (e.g. a local, a regional, or a national service region) of a mobile service provider in environment 100. While roaming within a radio access network comprising cell sites 108 and wireless access points 110, mobile subscribers employ mobile devices to communicate with other people and devices, for example by voice, video, or messaging. In addition, subscribers may employ mobile devices to receive, provide, or otherwise interact with IP-based services, such as Internet applications or services.

Mobile devices 104a, 104b, . . . 104n may include virtually any devices for communicating over a wireless network. Such devices include mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Referring to FIG. 1B, a mobile service provider provisions communication and IP-based services to mobile devices 104a, 104b, . . . 104n via an integrated communication system 150 that comprises, inter alia, a legacy core network 180, an IMS core 155, and a location mapping service ("LMS") 170. The legacy core network, via a mobile switching center ("MSC") 160, provides call switching and mobility management functions for mobile devices roaming in the various cell sites 108. The MSC permits mobile devices to communicate with each other and with telephones in a wider Public Switched Telephone Network ("PSTN"). As one example, the legacy core network may comprise a GPS/GPRS core network. The legacy core network also comprises a billing gateway 165 coupled to the MSC. The billing gateway is configured to bill or charge subscribers for the mobile services provided, including sessions switched by the legacy core network and sessions switched by the IMS core. Although FIG. 1B depicts a legacy core network with only a single MSC, a legacy core network may comprise multiple MSCs.

The IMS core 155 provides IP-based switching for communication and data sessions via its Call Session Control Functions ("CSCF"). As shown, the IMS core may comprise a limited number of CSCFs 152a, 152b, 152c. Each CSCF provides, inter alia, switching, signaling and control for IMS sessions, including Session Initiation Protocol (SIP) signaling that occurs between mobile devices, IP-based networks, the IMS core, and IP-based multimedia services and applications. To facilitate SIP signaling, each CSCF provides SIP registrar and proxy functionality. Although three CSCFs are shown, an IMS core may comprise any number of CSCFs. Each CSCF comprises the following constituent components: one or more proxy CSCFs ("P-CSCF"), one or more interrogating CSCFs ("I-CSCF"), and one or more serving CSCFs ("S-CSCF"). The functionalities of a CSCF and its constituent components are described in further detail by standards promulgated by the 3GPP, including 3GPP TS 23.002, version 9.2.0 Release 9, which is hereby incorporated by reference herein in its entirety. The IMS core is coupled to the MSC 160 via the LMS 170, which is described in greater detail herein. Although not shown, other connections may exist between the IMS core and the legacy core network 180.

Referring again to FIG. 1A, the mobile devices 104a, 104b, ... 104n may connect to the integrated communication system 150 via cell sites 108 that are operated by the service provider and distributed throughout the service region. A cell site is a fixed station configured to provide a wireless interface between mobile devices and a back-haul (not shown in FIG. 1A or 1B). A cell site and a mobile device may communicate by any wireless communication and data protocol or standard, including GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), GPRS, Enhanced Data GSM Environment ("EDGE"), Advanced Mobile Phone System ("AMPS"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like. Some cell sites, e.g., GSM base stations, may be associated with a globally unique identifier such as a Cell Global Identification ("CGI"). Although CGIs are subsequently used herein, one having skill in the art will appreciate that any unique cell site identifier may be used in lieu of CGIs in the methods and systems described herein.

A back-haul connects each cell site 108 to switching and signaling components of the integrated communication system 150, i.e., the MSC 160 and/or IMS core 155. A back-haul is typically a private network operated by the service provider. A back-haul may include one or more T-1 connections, T-3 connections, OC-3 connections, frame relay connections, Asynchronous Transfer Mode (ATM) connections, microwave connections, Ethernet connections, and/or the like. A back-haul may also include other intermediary components configured to facilitate communications between a cell site and the integrated communication system, such as a base station controller.

When a mobile device 104a, 104b, ... 104n initiates a communication or data session (e.g., a voice call) via a cell site 108, the switching and signaling for the session may be managed by the IMS core 155, the MSC 160, or both. The core networks used for a session may depend on the capabilities of the mobile device (e.g., a LTE phone versus a GSM phone), the capabilities of the cell site utilized (e.g., an LTE cell site versus a GSM base station), the type of session (e.g., a voice call versus a location-based application), or other factors.

A mobile device 104a, 104b, ... 104n may alternatively or additionally receive communication and IP-based services from a service provider by connecting to the IMS core 155 via a wireless access point 110. Like a base station, a wireless access point also provides a wireless network interface to a mobile device using any wireless communication and data protocol or standard. However, a wireless access point is connected to the IMS core over a public, IP-based Wide Area Network such as the Internet. In some examples, the wireless access point communicates with a mobile device using WiFi protocols (including 802.11 protocols), WiMAX protocols (including IEEE 802.16e-2005 and IEEE 802.16m protocols), LTE, LTE+, GAN, UMA, ZigBee, or UMB, and may utilize an unlicensed portion of the radio spectrum. A wireless access point may be operated by the service provider (e.g., a provider's hot spot), or may be a public, private, home or similar wireless network. To illustrate, a wireless access point may be a subscriber's home WiFi router that has a high-speed Internet connection. Although described herein as a wireless access point, one having skill in the art will appreciate that the methods described herein could be utilized for devices that access the IMS core via a wireline connection, such as a laptop computer that has a wired connection to the Internet.

In order to initiate an IMS multimedia session via the IMS core 155, a mobile device 104a, 104b, ... 104n discovers, connects to, and registers with a particular CSCF 152, either via a wireless access point 110 or a cell site 108. A mobile device registers its IP address with a CSCF by sending a SIP registration request message that includes a "REGISTER" method token and the public IP address of the mobile device. The device must also provide correct authentication and authorization credentials when challenged by the CSCF. Once registered, a mobile device may conduct multimedia IMS sessions via the CSCF.

When providing services to mobile devices, a service provider may break the service region into multiple billing regions. The service provider may charge a subscriber for a session using different billing rules or rates that depend on the billing region in which the subscriber initiates, conducts, and/or terminates the session. As one example, as depicted in FIG. 1A, an operator may break its service region into billing regions that reflect different time zones (e.g., Pacific, Mountain, Central, Eastern, etc.). As another example, a localized geographic area (e.g., a particular metropolitan area), such as the cross-hatched area 112 shown in FIG. 1A, may be a billing region. These examples are intended to be illustrative, not exhaustive; any subdivision or subset of a service region may be a billing region.

When a session is switched via the legacy core network 180, the billing gateway 165 determines the applicable billing region for the session by utilizing CGI information. The billing gateway also determines and applies the billing rules (e.g., billing rates) associated with an applicable billing region in order to charge a subscriber for the session. For example, when a voice call is switched via the MSC 160, the MSC receives an indication of which cell site 108 originated the call, such as a CGI or other unique identifier associated with the site. The MSC may then provide the received indication (i.e., CGI) to the billing gateway 165. Since a cell site has a known, fixed geographical position, the billing gateway may resolve a received CGI into a geographical location and billing region. To illustrate, when a subscriber initiates a voice call on a mobile device via a GSM cell site, the MSC may provide the CGI for that GSM cell site to the billing gateway. The gateway may use the CGI to determine which time zone the mobile device was in at the initiation of the call and bill the subscriber in accordance with the associated billing region.

In contrast, if a session is switched via the IMS core 155, the integrated communication system 150 may be unable to directly derive and utilize CGI information to determine a billing region for the session. When a mobile device 104 connects to the IMS core via a wireless access point, the session has no clear association with a CGI, since wireless access points are not associated with a CGI. Furthermore, even when a mobile device connects to the IMS core via a cell site 108, the SIP messages exchanged with the IMS core during an IMS session may not include CGI information. For example, if a mobile device communicates with a cell site 108 exclusively via IP-based protocols, the mobile device may not provide CGI information at any point during a session. Furthermore, in such an example, the cell site and/or the legacy core network 180 may not generate CGI information. To illustrate, at an "all-IP" LTE or LTE+ cell site, the communication system may not receive or generate CGI information for a session.

Furthermore, if an IMS session is switched via the IMS core 155, the integrated communication system 150 cannot utilize the identity of the switching CSCF 152 to determine the location of a mobile device 104 for billing purposes. There is generally no correlation between the CSCF used to register a particular mobile device and the geographic location of that mobile device. For example, as shown in FIG. 1A, mobile devices 104a and 104b may be located within the same billing region (e.g., "Central") and yet utilize different CSCFs (e.g., 152b and 152c, respectively). As another example, a single CSCF (e.g., 152b) may register mobile devices 104a and 104c from different billing regions (e.g., "Central" and "Western," respectively).

In order to seamlessly integrate the IMS core 155 with existing location-based billing methods of the legacy core network 180, a location mapping service ("LMS") 170 is therefore introduced into the integrated communication system 150. The LMS facilitates location-based billing for IMS sessions. The LMS uses the estimated location of a mobile device 104 in order to determine a CGI to associate with an IMS session. The LMS then provides the determined CGI to the legacy core network 180 so that the billing gateway 165 may determine a billing region to associate with the IMS session.

As will be described in greater detail herein, the LMS 170 determines an approximate physical location of a mobile device 104. For example, the LMS 170 may connect to and communicate with a geolocation server 175 that is configured to resolve a public IP address into an approximate physical location of a mobile device. The LMS then utilizes the physical location of the device to map an IMS session to a CGI. To do so, the LMS correlates each physical location within the service region with a billing CGI. Such correlation may be performed using a table or database, or may be performed using a shortest path algorithm as will discussed in additional detail herein.

The LMS 170 provides the determined CGI to the billing gateway 165. The billing gateway utilizes the CGI to determine a billing region for the session. To do so, the billing gateway maintains a table or database that correlates billing CGIs to billing regions. The billing gateway may then charge the subscriber according to the billing rules applicable to the billing region.

Although not shown in FIG. 1B, the integrated communication system 150 may comprise or connect directly or indirectly to location determination components that are configured to initiate, request or coordinate location determination processes in order to determine the estimated physical location of a mobile device (e.g., its latitude and longitude). For example, the IMS core may be connected to a Gateway Mobile Location Center ("GMLC"), a SUPL Location Center ("SLC") as described by the SUPL standards available from the Open Mobile Alliance ("OMA"), and/or an Emergency SMLC ("E-SMLC") as described by the IMS specifications and technical reports of the 3GPP. These components may be configured to determine and provide the location of a mobile device to a requesting location-based service, such as the LMS 170. Methods for determining a geographical location for a mobile device are discussed in greater detail in U.S. patent application Ser. No. 12/769,524, filed Apr. 28, 2010, and entitled "Location Continuity Service for Locating Mobile Devices Using Multiple Access Networks Including Wireless Telecommunication Networks," which is hereby incorporated by reference in its entirety.

B. Table Schemas to Map Mobile Device Location to Billing Regions

FIG. 2C depicts a table 285 schema that conceptually illustrates how the LMS 170 maps geographical locations to a billing CGI. As shown in FIG. 2C, the table includes a column 295 for a billing CGI that uniquely identifies a billing cell site 108. Each row 297, 299 in the table corresponds to a single CGI. In some examples, the table includes "dummy CGIs" that are not associated with a real, physical cell site 108 within a service provider's radio access network, but are instead an identifier utilized solely for location-based IMS billing. Furthermore, the table may not include a row for all CGIs in a service provider's radio access network, but may instead comprise only a subset of CGIs that provides sufficient geographic granularity to reflect the different billing regions utilized by the provider. For example, if a provider utilizes four time zone billing regions, the table may comprise only four rows. Since all of the CGIs within the service region of a service provider may share a common prefix (e.g., a common Mobile Country Code and/or Mobile Network Code), the table may store only the portion of a CGI that uniquely identifies a cell.

The table 285 also includes one or more location columns 287, 289, 291, 293 that define one or more sets of physical device locations that are associated with each billing CGI. A set of physical locations may be defined, for example, by a range of ZIP codes from a minimum ZIP code 287 to a maximum ZIP code 289. A set of physical locations may also be defined by a geographical area bounded by a minimum latitude/longitude pair 291 and a maximum latitude/longitude pair 293. To illustrate, as shown by row 297, the CGI "310.026.1F.B1.A2.0C.1A.C2.35.11" is associated in table 285 with all ZIP codes in the range 90200-90220, and the geographic area circumscribed by a square having two opposite corners at (36°; 115°) and (37°; 116°). As another illustration, as shown by row 299, the CGI "310.026.DA.21.C1.DD.52.78.9A.35" is associated with only a single zip code, "93560." Although not shown, in some examples each billing CGI may be associated with a single latitude/longitude point, e.g., the physical location of the associated cell site. In such examples, the LMS 170 may select the billing CGI that is associated with a cell site that has the shortest path to the location of a mobile device, as compared to the other cell sites in the table 285. That is, the LMS 170 may calculate the distance between the mobile device and some of the cell sites in the table 782 and select the cell site that is closest in straight-line distance to the mobile device. These examples are intended to be illustrative, not exhaustive. The table 285 may define physical location sets by any suitable method, so long as the method provides sufficient geographical granularity to reflect the different billing regions utilized by the provider. Although not shown, the table 285 may also include one or more columns used to store billing regions associated with a billing CGI.

FIG. 2A depicts a table 200 schema that conceptually illustrates how the LMS 170 maps an IMS session to an estimated location of a mobile device 104 and a billing CGI. As shown in FIG. 2A, the table 200 includes a column 205 for a session identifier ("ID") that identifies an IMS session, such as an IMS Charging Identifier ("ICID"). Each row 230, 235, 240 in the table corresponds to a single session ID. The table may also include a column 210 for one or more device identifiers that uniquely identify the mobile device used for a session. Although not shown, the table 200 may also include columns for any additional identifiers associated with a session, such as a subscriber identifier or an Inter-Operator Identifier ("IOI").

The table 200 includes a device location column 215, which stores the estimated physical location of a mobile device 104 at one or more points during a session (e.g., session initiation or termination). As described in greater detail herein, the LMS 170 may determine the mobile device's estimated location using a public IP address associated with the mobile device. As shown at row 230, the table 200 may store a determined device location as the estimated latitude and longitude of the device. As shown at rows 240 and 235 respectively, the table may alternatively or additionally store a determined device location as a full street address or a subset of a street address (e.g., a ZIP or postal code). These examples are intended to be illustrative, not exhaustive. The table 200 may store a device's physical location in any format that provides sufficient granularity to determine a billing region for a session.

The table 200 also includes a billing CGI column 220. As described in greater detail herein, the LMS 170 uses a mobile device's location in order to determine a billing CGI that the billing gateway 165 should use to charge for an IMS session. The LMS associates the determined billing CGI with the session ID. Since all of the CGIs within the service region of a service provider may share a common prefix, the table 200 may instead store only the portion of the CGI that uniquely identifies a cell.

The table 200 may also include a column 225 for storing session characteristics, including session characteristics that may be utilized to charge a subscriber for an IMS session. For example, as shown, the column 225 may store a session initiation time, session duration, and/or an indication of the volume of data transferred during a session. To illustrate, as shown at row 230, the IMS session identified as "54321" began on Oct. 30, 2010, at 10:45 UTC, lasted 60 minutes, and utilized 300 MB of data transfer to and from the mobile device 104 identified as "1235ABC."

FIG. 2B depicts a table 250 schema that conceptually illustrates how the billing gateway 165 maps a billing CGI to one or more billing regions. As shown in FIG. 2B, the table 250 includes a column 255 for a CGI that uniquely identifies a cell site 108. Each row 270, 275, 280 in the table corresponds to a single CGI. In some examples, the table 250 may include "dummy CGIs," as described previously.

The table 250 also includes one or more columns 260, 265 used to store billing regions associated with a billing CGI. For example, the table may include a column 260 that reflects a time zone associated with each CGI. As another example, the table may include a column 265 that reflects a metropolitan region code associated with each CGI. To illustrate, as shown at row 270, the CGI "310.026.1F.B1.A2.0C.1A.C2.35.11" may be associated with the billing regions of "Pacific" time zone and the "LAX" metro code. These examples of billing regions are intended to be illustrative, not exhaustive. Table 250 may include a billing region column that reflects any type of subdivision of a service region.

C. Methods for Billing a Subscriber for IMS Services

Figure 3:
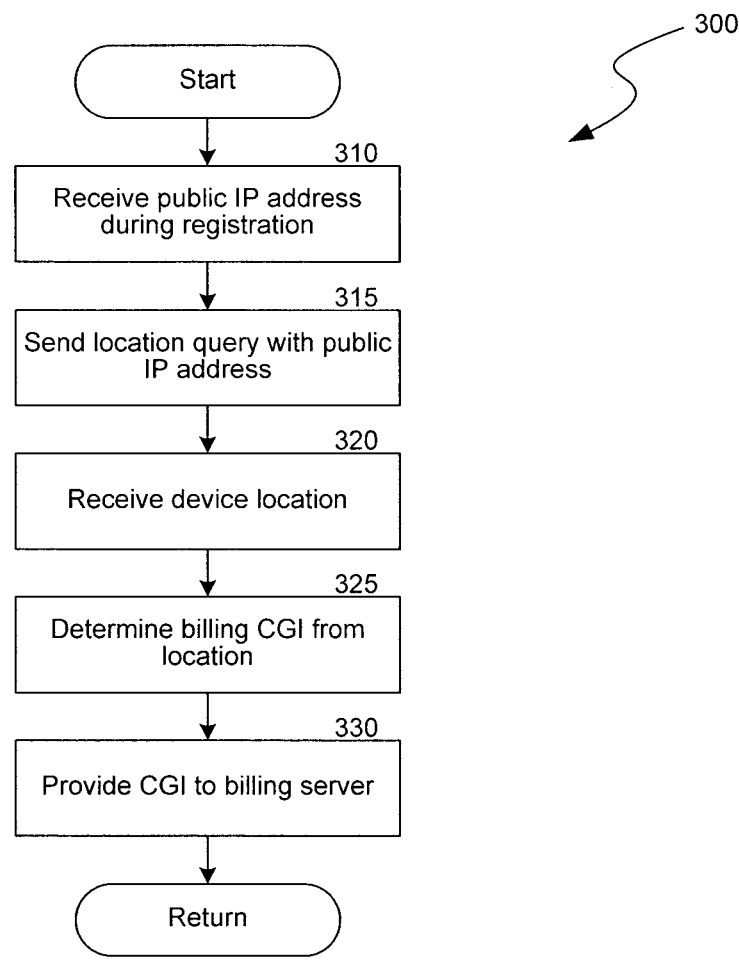
FIG. 3 is a logical flow diagram of a process for billing a subscriber for IMS services using the location of a mobile device.

FIG. 3 is a logical flow diagram of a process 300 for billing a subscriber for IMS services using the location of a mobile device. The LMS 170 or another component of the integrated communication system 150 may perform the process.

The process 300 begins at block 310, when the LMS 170 receives a public IP address associated with the wireless access point 110 being utilized by the mobile device 104. The LMS receives the address during registration of the mobile device with the IMS core 155. For example, after initial procedures to discover a CSCF 152, the mobile device may send its public IP address in a SIP registration message to a P-CSCF within the discovered CSCF. The P-CSCF forwards the registration message to an I-CSCF, which forwards the message to an S-CSCF. The S-CSCF then extracts the IP address from the message and sends it to the LMS. The S-CSCF may also send additional session information to the LMS, such as a session identifier or other identifiers (e.g., device or subscriber identifiers). Although not shown, the LMS may store the received IP address and/or other received session information, e.g., in the table 200. Additionally, although not shown, the LMS may receive and store other information relating to session characteristics from components of the IMS core 155, e.g., during an IMS session.

At block 315, the LMS 170 sends a query for the estimated physical location of the mobile device 104 to a geolocation server 175; the query comprises the public IP address of the access point, which approximates the position of the mobile device. The service provider may operate the geolocation server, or a third party may operate the geolocation server. The geolocation server may utilize any suitable method to resolve the public IP address into an estimated physical location of the mobile device and may attempt to resolve the IP address using more than one method. For example, the geolocation server may utilize a WHOIS service to retrieve a registrant's physical street address that is associated with the public IP address. As another example, the geolocation server may access location information provided by a subscriber that is associated with the access point. As yet another example, the geolocation server may utilize a commercial service that provides estimated physical location based on IP address.

Alternatively or additionally, the LMS 170 and/or the geolocation server 175 may determine the estimated location of the mobile device 104 by initiating a location determination process implemented by components of the mobile device (e.g., a Global Positioning Systems ("GPS") component) and/or other system components (e.g. an Assisted-GPS ("A-GPS") transceiver on a cell site 108) to physically locate the mobile device. For example, the geolocation server may initiate a GPS or A-GPS process at a GMLC or SLC in order to locate the mobile device. These examples are not intended to be exhaustive. A multitude of location determination techniques may be utilized to estimate the physical location of a mobile device, including Time Difference on Arrival ("TDOA") (including Uplink-TDOA (U-TDOA), Observed TDOA ("OTDOA"), Ideal Period Downlink-OTDOA ("IPDL-OTDOA"), and other TDOA procedures), Cell Identification ("CI"), CI plus Timing Advance ("CI-TA"), Assisted Global Navigation Satellite System ("AGNSS"), Round Trip Time ("RTT") measurements, CI plus RTT ("CI-RTT"), Enhanced Observed Time Difference ("E-OTD"), WiFI Data Base location, Customer provided address location, IP Location, and/or triangulation.

At block 320, the LMS 170 receives the estimated physical location of the mobile device 104 from the geolocation server 175 or another system component (e.g., the mobile device, GMLC, or SLC). For example; the LMS may receive an estimated country, region, city, ZIP/postal code, latitude and/or longitude. The LMS may store the received physical location in conjunction with the session information, e.g., in the table 200.

At block 325, the LMS 170 determines a billing CGI from the physical location of the mobile device 104. As described previously, the LMS maintains a lookup table 285 that correlates each identified area within the service region to a billing CGI. The table 285 may support the lookup of a billing CGI from a ZIP/postal code, a latitude/longitude pair, or other types of location information. The LMS may store the determined billing CGI in association with the session information, including a session identifier and session characteristics, e.g., in the table 200.

At block 330, the LMS 170 provides the determined billing CGI to the billing gateway 165, along with associated session information, including a session identifier and session characteristics. The LMS sends the billing CGI to the billing gateway via the MSC 160. The LMS may send the billing CGI during call control procedures. The process 300 then returns.

It will be appreciated that the billing process for an IMS session should support both online and offline charging. Online charging entails interaction with the billing system to allow charges to be applied for an IMS session at the time of the session. Offline charging collects charging information about an IMS session and subsequently conveys the charging information after the IMS session has been completed. Online charging may be implemented using an Event Collection Function (ECF), which collects session events coordinates the deduction from, or charging of, a user's account at the time of the session. Offline charging may be implemented using a Charging Collection Function (CCF), which receives and stores charging information pertaining to one or more IMS sessions and processes charges associated with those sessions at a later time.

Although not shown in FIG. 3, after the conclusion of process 300, the billing gateway 165 bills or charges the subscriber for the IMS session using the billing CGI provided by the LMS 170. For example, the billing gateway may look up the billing regions associated with the billing CGI in the table 250 maintained by the billing gateway. The billing gateway may then utilize the billing regions to identify billing rules (e.g., billing rates) associated with the regions and charge the subscriber in accordance with those rules. To illustrate, the billing gateway may determine that a session having a particular billing CGI originated in the Pacific time zone and determine that the applicable billing rate for the session is therefore 10 cents/minute plus 1 cent/MB of data transferred.

CONCLUSION

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

I claim:

1. A method for determining a billing region to utilize for charging a mobile subscriber for an Internet Protocol Multimedia Subsystems ("IMS") session, wherein the IMS session is conducted between the subscriber's mobile device and an IMS core network, the method comprising:
   receiving a public Internet Protocol ("IP") address associated with the mobile device during registration of the mobile device with the IMS core network;
   sending a query to a geolocation server for an estimated physical location of the mobile device, wherein the query includes an indication of the received public IP address;
   determining an estimated physical location of the mobile device based at least in part on the received public IP address;
   receiving the estimated physical location of the mobile device from the geolocation server;
   identifying a billing Cell Global Identification ("CGI") that is associated with the estimated physical location of the mobile device, the billing CGI is a dummy CGI that is not associated with a physical cell site in a radio access network that uses licensed frequency spectrum; and
   providing the billing CGI to a billing server in conjunction with a session identifier that is associated with the IMS session, wherein the billing server is configured to determine a billing region from the billing CGI.

2. The method of claim 1, wherein the billing server is part of a legacy core network that provides call switching and mobility management functions, and wherein the billing server performs charging functions for both:
   legacy communication sessions that are initiated on the mobile device, wherein the legacy communication sessions are switched by the legacy core network; and
   IMS sessions that are initiated on the mobile device, wherein the IMS sessions are switched by the IMS core network.

3. The method of claim 2, wherein the legacy core network comprises a Global System for Mobile Communications core network.

4. The method of claim 1, wherein the mobile device initiates the IMS session via a wireless access point.

5. The method of claim 1, wherein the geolocation server is configured to determine the estimated physical location of the mobile device by using a WHOIS service.

6. The method of claim 1, wherein the geolocation server is configured to determine the estimated physical location of the mobile device by utilizing subscriber-provided location information.

7. The method of claim 1, wherein the geolocation server is configured to determine the estimated physical location of the mobile device using a location determination technique selected from the group consisting of: TDOA, U-TDOA, OTDOA, IPDL-OTDOA, CI, CI-TA, GPS, A-GPS, RTT, CI-RTT, E-OTD, IP Location, WiFi Data Base location, customer provided address location, and triangulation.

8. The method of claim 1, wherein the billing region corresponds to a time zone.

9. The method of claim 1, wherein identifying the billing CGI that is associated with the estimated physical location of the mobile device comprises identifying a billing CGI by a latitude/longitude pair.

10. The method of claim 1, wherein identifying the billing CGI that is associated with the estimated physical location of the mobile device comprises identifying a billing CGI by a postal or ZIP code.

11. The method of claim 1, wherein identifying the billing CGI that is associated with the estimated physical location of the mobile device comprises identifying a billing CGI by a street address.

12. The method of claim 1, further comprising providing session characteristics to the billing server in conjunction with the billing CGI.

13. The method of claim 1, wherein the billing server is further configured to perform charging functions by determining and applying billing rules, including billing rates, that are associated with the billing region.

14. The method of claim 1, wherein the billing server is further configured to perform online charging using the determined billing region.

15. The method of claim 1, wherein the billing server is further configured to perform offline charging using the determined billing region.

16. A non-transitory computer-readable medium containing instructions that, when executed by a computer processor, implement a method to determine a billing region to utilize for charging a mobile subscriber for an Internet Protocol Multimedia Subsystems ("IMS") session, wherein the IMS session is conducted between the subscriber's mobile device and an IMS core network, the method comprising:
receiving a public Internet Protocol ("IP") address associated with the mobile device during registration of the mobile device with the IMS core network;
sending a query to a geolocation server for an estimated physical location of the mobile device, wherein the query includes an indication of the received public IP address;
determining an estimated physical location of the mobile device based at least in part on the received public IP address;
receiving the estimated physical location of the mobile device from the geolocation server;
identifying a billing Cell Global Identification ("CGI") that is associated with the estimated physical location of the mobile device, the billing CGI is a dummy CGI that is not associated with a physical cell site in a radio access network that uses licensed frequency spectrum; and
providing the billing CGI to a billing server in conjunction with a session identifier that is associated with the IMS session, wherein the billing server is configured to determine a billing region from the billing CGI.

17. The non-transitory computer-readable medium of claim 16, wherein the billing server is part of a legacy core network that provides call switching and mobility management functions, and wherein the billing server performs charging functions for both:
legacy communication sessions that are initiated on the mobile device, wherein the legacy communication sessions are switched by the legacy core network; and
IMS sessions that are initiated on the mobile device, wherein the IMS sessions are switched by the IMS core network.

18. The non-transitory computer-readable medium of claim 17, wherein the legacy core network comprises a Global System for Mobile Communications core network.

19. The non-transitory computer-readable medium of claim 16, wherein the mobile device initiates the IMS session via a wireless access point.

20. The non-transitory computer-readable medium of claim 16, wherein the geolocation server is configured to determine the estimated physical location of the mobile device by using a WHOIS service.

21. The non-transitory computer-readable medium of claim 16, wherein the geolocation server is configured to determine the estimated physical location of the mobile device by utilizing subscriber-provided location information.

22. The non-transitory computer-readable medium of claim 16, wherein the geolocation server is configured to determine the estimated physical location of the mobile device using a location determination technique selected from the group consisting of: TDOA, U-TDOA, OTDOA, IPDL-OTDOA, CI, CI-TA, GPS, A-GPS, RTT, CI-RTT, E-OTD, IP Location, WiFi Data Base location, customer provided address location, and triangulation.

23. The non-transitory computer-readable medium of claim 16, wherein the billing region corresponds to a time zone.

24. The non-transitory computer-readable medium of claim 16, wherein identifying the billing CGI that is associated with the estimated physical location of the mobile device comprises identifying a billing CGI by a latitude/longitude pair.

25. The non-transitory computer-readable medium of claim 16, wherein identifying the billing CGI that is associated with the estimated physical location of the mobile device comprises identifying a billing CGI by a postal or ZIP code.

26. The non-transitory computer-readable medium of claim 16, wherein identifying the billing CGI that is associated with the estimated physical location of the mobile device comprises identifying a billing CGI by a street address.

27. The non-transitory computer-readable medium of claim 16, wherein the billing CGI is solely for IMS billing purposes.

28. The non-transitory computer-readable medium of claim 16, wherein the method further comprises providing session characteristics to the billing server in conjunction with the billing CGI.

29. The non-transitory computer-readable medium of claim 16, wherein the billing server is further configured to perform charging functions by determining and applying billing rules, including billing rates, that are associated with the billing region.

30. The non-transitory computer-readable medium of claim 16, wherein the billing server is further configured to perform online charging using the determined billing region.

31. The non-transitory computer-readable medium of claim 16, wherein the billing server is further configured to perform offline charging using the determined billing region.

\* \* \* \* \*